(12) United States Patent
Zhong et al.

(10) Patent No.: US 11,599,711 B2
(45) Date of Patent: Mar. 7, 2023

(54) AUTOMATIC DELINEATION AND EXTRACTION OF TABULAR DATA IN PORTABLE DOCUMENT FORMAT USING GRAPH NEURAL NETWORKS

(71) Applicant: International Business Machines Corporation, Armonk, NY (US)

(72) Inventors: Peter Zhong, Vermont (AU); Antonio Jose Jimeno Yepes, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/111,392

(22) Filed: Dec. 3, 2020

(65) Prior Publication Data
US 2022/0180044 A1    Jun. 9, 2022

(51) Int. Cl.
*G06F 40/157* (2020.01)
*G06N 3/04* (2023.01)
(Continued)

(52) U.S. Cl.
CPC ............. *G06F 40/157* (2020.01); *G06N 3/04* (2013.01); *G06N 3/08* (2013.01); *G06V 30/413* (2022.01); *G06V 30/414* (2022.01)

(58) Field of Classification Search
CPC ........... G06K 9/00463; G06K 9/00449; G06K 9/00456; G06F 40/177; G06F 40/151;
(Continued)

(56) References Cited

U.S. PATENT DOCUMENTS 5,048,107 A * 9/1991 Tachikawa ........... G06K 9/4638
382/173
5,848,186 A * 12/1998 Wang ................. G06K 9/00463
382/176
(Continued)

FOREIGN PATENT DOCUMENTS

CN    107085565 A    8/2017
CN    107590448 A    1/2018

OTHER PUBLICATIONS

Jason Brownlee, "How Does Attention Work in Encoder-Decoder Recurrent Neural Networks", publisher: Machine Learning Mastery published: Aug. 7, 2019, pp. 1-21. (Year: 2019).*
(Continued)

*Primary Examiner* — Wilson W Tsui
(74) *Attorney, Agent, or Firm* — Stephen R. Yoder

(57) ABSTRACT

Aspects of the present invention disclose a method for automatic delineation and extraction of tabular data in portable document format (PDF). The method includes one or more processors extracting metadata corresponding to tabular data in a text-based portable document format (PDF), wherein the metadata is associated with characters and border lines of the tabular data. The method further includes generating a graph structure corresponding to the tabular data in the text-based PDF based at least in part on the metadata. The method further includes generating a vector representation of the graph structure. The method further includes constructing a tree structure corresponding to the tabular data based at least in part on the vector representation.

17 Claims, 5 Drawing Sheets

(51) Int. Cl.
  *G06N 3/08* (2023.01)
  *G06V 30/413* (2022.01)
  *G06V 30/414* (2022.01)

(58) Field of Classification Search
  CPC ....... G06F 40/166; G06F 40/157; G06N 3/04; G06N 3/08; G06V 30/413; G06V 30/414
  See application file for complete search history.

(56) References Cited

U.S. PATENT DOCUMENTS

| | | | | |
|---|---|---|---|---|
| 6,006,240 | A * | 12/1999 | Handley | G06K 9/00449 715/220 |
| 6,757,870 | B1 * | 6/2004 | Stinger | G06F 40/177 715/234 |
| 9,965,809 | B2 | 5/2018 | Déjean | |
| 10,241,992 | B1 | 3/2019 | Middendorf | |
| 10,452,699 | B1 | 10/2019 | Keskar et al. | |
| 10,452,700 | B1 | 10/2019 | Truong et al. | |
| 10,482,174 | B1 | 11/2019 | Goodsitt et al. | |
| 2003/0097384 | A1 * | 5/2003 | Hu | G06K 9/00463 715/234 |
| 2007/0041642 | A1 * | 2/2007 | Romanoff | G06K 9/00463 382/177 |
| 2015/0093021 | A1 * | 4/2015 | Xu | G06K 9/00463 382/159 |
| 2017/0329749 | A1 | 11/2017 | Milward | |
| 2019/0340240 | A1 | 11/2019 | Duta | |
| 2020/0097451 | A1 | 3/2020 | Pisipati | |
| 2020/0410231 | A1 * | 12/2020 | Chua | G06K 9/00463 |

OTHER PUBLICATIONS

"A System for Detecting & Extracting Data From Tables in Text Documents", IP.com No. IPCOM000219454D, IP.com Electronic Publication Date: Jul. 2, 2012, 3 pps.

"Enriching Text Documents With Charts From Data in the Document", IP.com No. IPCOM000255277D, IP.com Electronic Publication Date: Sep. 14, 2018, 6pps.

"Involuntary Revolution of Formless/Semi-Structured Document and Applying Different Analytics", IP.com No. IPCOM000256074D, IP.com Electronic Publication Date: Nov. 2, 2018, 6 pps.

Crommelinck, et al., "Application of Deep Learning for Delineation of Visible Cadastral Boundaries From Remote Sensing Imagery", Remote Sens. 2019, 11, 2505; doi:10.3390/rs11212505, MDPI, 21 pps.

Qasim et al., "Rethinking Table Recognition using Graph Neural Networks", arXiv:1905.13391v2 [cs.CV] Jul. 3, 2019, 6 pps., <https://arxiv.org/pdf/1905.13391.pdf>.

Riba et al., "Table Detection in Invoice Documents by Graph Neural Networks", 6 pps., 2019, <https://priba.github.io/assets/publi/conf/2019_ICDAR_PRiba.pdf>.

Yang et al., "Building Extraction at Scale Using Convolutional Neural Networks: Mapping of the United States", Journal of Latex Class Files, vol. 14, No. 8, Aug. 2015, 16 pps.

"Patent Cooperation Treaty PCT Notification of Transmittal of the International Search Report and the Written Opinion of the International Searching Authority, or the Declaration", Applicant's file reference PF210859PCT, International application No. PCT/CN2021/131195, International filing date Nov. 17, 2021, Date of mailing Feb. 10, 2022, 10 pages.

* cited by examiner

| Sample size | Mean Deviation From 5% | | | | Relative power (%) | | | |
|---|---|---|---|---|---|---|---|---|
| | T | U | WMW | BM | T | U | WMW | BM |
| 10, 10 | 0.19 | 0.30 | 0.60 | 0.75 | 90.2 | 88.4 | 86.7 | 100.0 |
| 25, 25 | 0.10 | 0.08 | 0.33 | 0.23 | 96.2 | 96.1 | 99.1 | 100.0 |
| 50, 50 | 0.04 | 0.05 | 0.23 | 0.11 | 97.5 | 97.4 | 100.0 | 99.7 |
| 100, 100 | 0.07 | 0.07 | 0.27 | 0.09 | 98.3 | 98.3 | 100.0 | 99.7 |
| 25, 10 | 1.27 | 0.29 | 1.24 | 0.42 | 94.1 | 94.1 | 96.7 | 100.0 |
| 50, 10 | 1.85 | 0.35 | 1.90 | 0.50 | 91.2 | 91.2 | 100.0 | 98.3 |

FIG. 3A

| Sample size | Mean |
|---|---|
| 10, 10 | 0.19 |
| 25, 25 | 0.10 |

FIG. 3B

AUTOMATIC DELINEATION AND EXTRACTION OF TABULAR DATA IN PORTABLE DOCUMENT FORMAT USING GRAPH NEURAL NETWORKS

BACKGROUND OF THE INVENTION

The present invention relates generally to the field of machine learning, and more particularly to delineation and extraction of tabular data in portable document format.

Lots of learning tasks require dealing with graph data which contains rich relation information among elements. Graph neural networks (GNNs) are connectionist models that capture the dependence of graphs via message passing between the nodes of graphs. Unlike standard neural networks, graph neural networks retain a state that can represent information from its neighborhood with arbitrary depth. Although the primitive GNNs have been found difficult to train for a fixed point, recent advances in network architectures, optimization techniques, and parallel computation have enabled successful learning with them. In recent years, systems based on variants of graph neural networks such as graph convolutional network (GCN), graph attention network (GAT), gated graph neural network (GGNN) have demonstrated ground-breaking performance on many tasks mentioned above.

Graph attention networks (GATs), novel neural network architectures that operate on graph-structured data, leveraging masked self-attentional layers. Stacking layers in which nodes are able to attend over their neighborhoods' features, enables (e.g., implicitly) specifying different weights to different nodes in a neighborhood, without requiring any kind of costly matrix operation (e.g., inversion) or depending on knowing the graph structure upfront.

Delaunay triangulation (also known as a Delone triangulation) for a given set 'P' of discrete points in a plane is a triangulation DT(P) such that no point in 'P' is inside the circumcircle of any triangle in DT(P). The Delaunay triangulation of a discrete point set 'P' in general position corresponds to the dual graph of the Voronoi diagram for 'P'. The circumcenters of Delaunay triangles are the vertices of the Voronoi diagram. In the 2D case, the Voronoi vertices are connected via edges, that can be derived from adjacency-relationships of the Delaunay triangles.

SUMMARY

Aspects of the present invention disclose a method, computer program product, and system for automatic delineation and extraction of tabular data in portable document format (PDF). The method includes one or more processors extracting metadata corresponding to tabular data in a text-based portable document format (PDF), wherein the metadata is associated with characters and border lines of the tabular data. The method further includes one or more processors generating a graph structure corresponding to the tabular data in the text-based PDF based at least in part on the metadata. The method further includes one or more processors generating a vector representation of the graph structure. The method further includes one or more processors constructing a tree structure corresponding to the tabular data based at least in part on the vector representation.

BRIEF DESCRIPTION OF THE DRAWINGS

FIG. 3A is a diagram depicting an illustration of a table of a text-based PDF document, in accordance with embodiments of the present invention.

FIG. 3B is a diagram depicting an illustration of an exploded view of a table of a text-based PDF document, in accordance with embodiments of the present invention.

DETAILED DESCRIPTION

Embodiments of the present invention allow for automatic delineation and extraction of tabular data in portable document format (PDF). Embodiments of the present invention convert tabular data in text-based PDF format to a structure format, which formulates a PDF file of the tabular data as a graph, where each character is treated as a node. Embodiments of the present invention encode nodes of a generated graph into vector representation. Additional embodiments of the present invention create a tree structure corresponding to tabular data from one or more node embeddings and adjacency relationships. Further embodiments of the present invention assign attributes to leaves of a generated tree structure.

Over three trillion documents are available in Portable Document Format (PDF), and these documents can include many tables that summarize information more effectively than conveying in natural language. PDF documents are ready to be printed on screen or paper, but are not machine readable. As a result, efforts have been devoted to making these documents machine readable, which would allow for automatic processing by natural language processing algorithms.

Some embodiments of the present invention recognize that rule-based approaches to understanding tables of PDF documents are limited to the capabilities of the generator of the rules, are not trainable, and as a result cannot be automatically optimized for new document domains. Additionally, machine learning approaches require tabular regions of PDF documents to be converted to images and analyzed with computer vision models, which face challenges with resolution and graphics processing unit (GPU) memory, that do not utilize valuable meta data of the PDF document file. Various embodiments of the present invention remedy such challenges by utilizing metadata of a PDF document to formulate a graph of a tabular data and encodes nodes and edges of the graph. In addition, embodiments of the present invention utilize the encoded graph features to reconstruct a tree structure of the tabular data and determines attributes of leaves of the tree structure.

Embodiments of the present invention recognize that computing systems experience GPU memory problems while processing tabular data via computer vision models. Various embodiments of the present invention can operate to increase the efficiency of a computing system by utilizing a graph neural network (GNN) based solution to convert tabular data in text-based PDF format to a structure format using metadata of corresponding to the tabular data. As a result, reducing the amount of processing resources utilized by eliminating GPU memory problems associated with converting tabular data of PDF files to images and extracting information from the converted images.

Implementation of embodiments of the invention may take a variety of forms, and exemplary implementation details are discussed subsequently with reference to the Figures.

Figure 1:
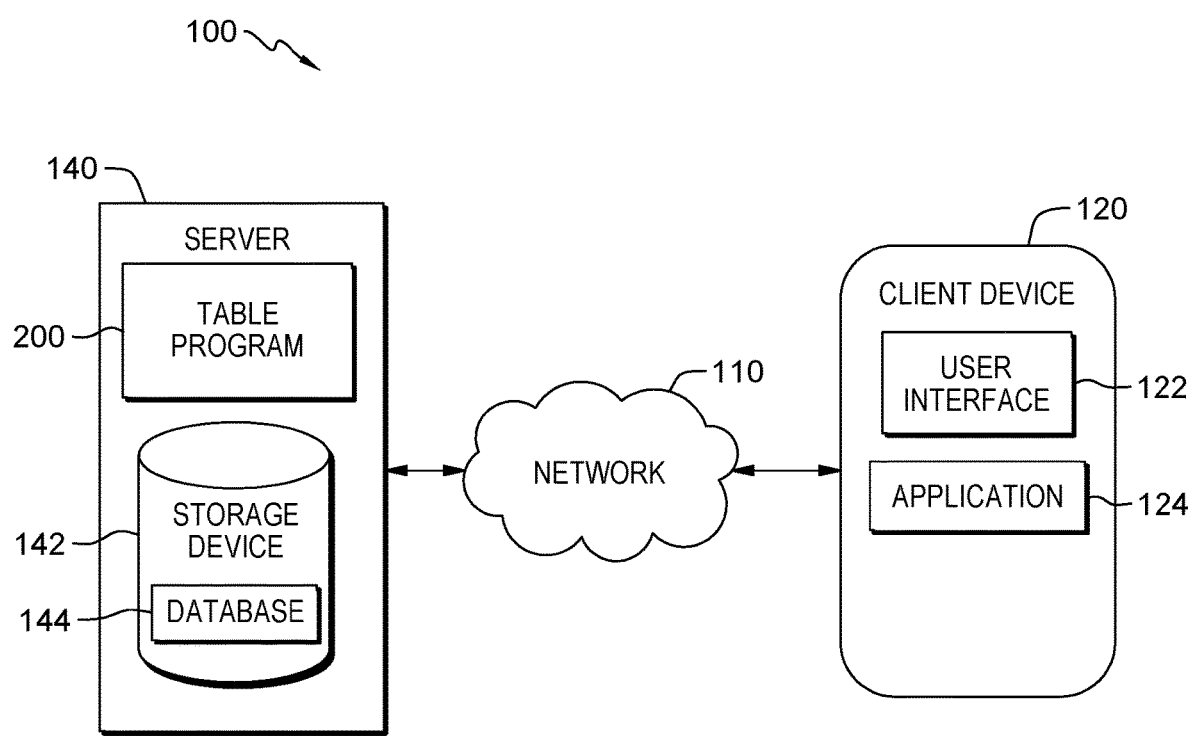
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, which may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Table program 200 enables the authorized and secure processing of personal data. Table program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Table program 200 provides information regarding personal data and the nature (e.g., type, scope, purpose, duration, etc.) of the processing. Table program 200 provides the user with copies of stored personal data. Table program 200 allows the correction or completion of incorrect or incomplete personal data. Table program 200 allows the immediate deletion of personal data.

Distributed data processing environment 100 includes server 140 and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of table program 200.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and table program 200. Storage device 142 can be implemented with any type of storage device, for example, persistent storage 405, which is capable of storing data that may be accessed and utilized by client device 120 and server 140, such as a database server, a hard disk drive, or a flash memory. In one embodiment, storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes PDF files, metadata of PDF files, tabular data, etc. In one embodiment, data processing environment 100 can include additional servers (not shown) that host additional information that accessible via network 110.

Generally, table program 200 can convert tabular data in text-based PDF format to a structure format while avoiding using heuristics to parse PDF data (e.g., words, lines, text-boxes, etc.), which enables end-to-end training and processing. In one embodiment, table program 200 generates a tree structure of a table of a document of database 144. For example, table program 200 generates a graph of a table of a PDF document using PDF information (e.g., metadata of a table of the PDF) and Delaunay triangulation. In this example, table program 200 utilizes a machine learning algorithm (e.g., attentional GNN) to encode the nodes and edges of the graph into a feature space. Table program 200 utilizes the encoded features of the graph to reconstruct a tree structure of the table, where table program 200 predicts a sequence of tree operations. Additionally, table program 200 predicts attributes of leaves (e.g., table cell) of the tree structure. As a result, modeling the PDF data as a graph and using the machine learning algorithm to derive insight form the graph allows utilization of the PDF information. The machine learning algorithm of table program 200 can include a tree-builder model and cell-builder model that are sequential, which can utilize state information nodes that allows state history to be taken into account when making predictions.

Figure 2:
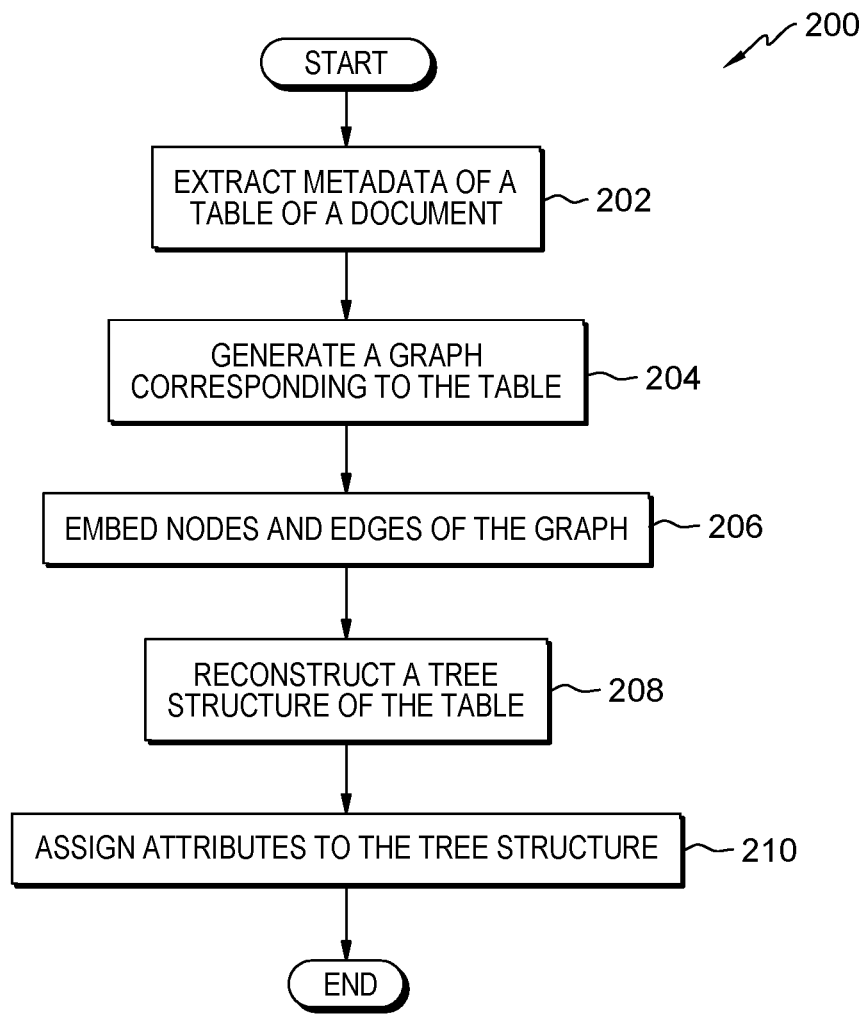
FIG. 2 is a flowchart depicting operational steps of a program, within the data processing environment of FIG. 1, for automatic delineation and extraction of tabular data in portable document format (PDF), in accordance with embodiments of the present invention.

FIG. 2 is a flowchart depicting operational steps of table program 200, a program that converts tabular data in text-based PDF format to a structure format, in accordance with embodiments of the present invention. In one embodiment, table program 200 initiates in response to a user connecting client device 120 to table program 200 through network 110. For example, table program 200 initiates in response to a user registering (e.g., opting-in) a laptop (e.g., client device 120) with table program 200 via a WLAN (e.g., network 110). In another embodiment, table program 200 is a background application that continuously monitors client device 120. For example, table program 200 is a client-side application (e.g., application 124) that initiates upon booting of a laptop (e.g., client device 120) of a user and monitors the laptop to detect the user accessing a PDF file that includes tabular data (e.g., a table).

In step 202, table program 200 extracts metadata of a table of a document. In one embodiment, table program 200 extracts metadata corresponding to tabular data of a PDF document of database 144. For example, table program 200 extracts information (e.g., metadata) corresponding to a table (e.g., tabular data) from a text-based PDF document. In this example, table program 200 identifies information that includes location and font information of characters and location of lines of the table. Additionally, table program 200 can utilize a PDF parsing to extract metadata of the text-based PDF document, which precludes the user of heuristics to parser the text-based PDF document.

FIG. 3A depicts table 310, which is an example illustration of an instance of a table of a text-based PDF document that table program 200 converts, in accordance with example embodiments of the present invention. Table 310 includes line 312, line 314, line 316, header 313, and body 315. Line 312, line 314, and line 316, hereinafter line(s), are borders of table 310. Header 313 corresponds to rows tabular data table 310 between line 312 and line 314 used to label each column of body 315. Body 315 is the main part of table 310, which contains the numerical information classified with respect to row and column captions. In an example embodiment with respect to FIG. 3A, table program 200 utilizes receives table 310 from client device 120 and stores table 310 in database 144.

FIG. 3B depicts processed table 320, which is an example illustration of an exploded view of table 310 after table program 200 has initiated extraction of metadata, in accordance with example embodiments of the present invention. Table 320 includes line 312, line 314, and bounding box 322. Bounding box 322 is a bounding box indicative of a character identified during metadata extraction. In an example embodiment with respect to FIG. 3B, table program 200 includes one or more instances of bounding box 322, which corresponds to each character of table 310 of FIG. 3A as shown in FIG. 3B. In this example embodiment, table program 200 collects font and location information for each instance of bounding box 322 of table 310 as well as location information for the line(s) of table 310.

In step 204, table program 200 generates a graph corresponding to the table. In one embodiment, table program 200 generates a graph corresponding to tabular data of a PDF document of database 144. For example, table program 200 utilizes triangulation techniques (e.g., Delaunay Triangulation) and location information (e.g., metadata) of each character of a table (e.g., tabular data) of a text-based PDF document to generate a graph structure corresponding to characters of the table. In this example, table program 200 computes a Delaunay Triangulation 'DT' of a set of 'P' of discrete points (e.g., each character of the table) 'DT(P)' such that no point of the set of 'P' is within a circumcircle of any triangle in DT(P). The Delaunay triangulation of a discrete point set 'P' in general position corresponds to the dual graph of a Voronoi diagram for 'P', where circumcenters of the Delaunay triangles are vertices 'V' of the Voronoi diagram and in the two dimensional (2D) cases, the Voronoi vertices 'V' are connected via edges 'E', that can be derived from adjacency-relationships of the Delaunay triangles. Additionally, table program 200 generates a graph structure corresponding to the table utilizing vertices 'V' and edges 'E' (e.g., Graph (V, E)), which represent the locations and adjacency relationships of each of the characters of the table. Referring now to FIG. 3B, in an example embodiment, table program 200 utilizes the one or more instances of bounding box 322 as circumcenters (e.g., vertices 'V') Delaunay triangles to generate a graph structure based on adjacency-relationships of the one or more instances of bounding box 322 as circumcenters for characters of table 320.

In step 206, table program 200 embeds nodes and edges of the graph. In one embodiment, table program 200 utilizes a machine learning algorithm to generate a vector representation of the generated graph. For example, table program 200 utilizes an attention graph neural network (e.g., machine learning algorithm) to encode nodes and edges of a generated graph structure (e.g., Graph (V, E)) into a feature space. In this example, table program 200 generates a set of feature vectors corresponding to each node 'V' (e.g., characters) and each edge 'E' of respective sets of the generated graph structure. Additionally, table program 200 utilizes metadata of the table and information of the 'DT' to generate the set of feature vectors correspond to a node of the set of nodes 'V' that can include features such as character, location information (e.g., bounding box), font features (e.g., bold, italics, etc.), etc. Also, table program 200 utilizes metadata of the table and information of the 'DT' to generate the set of feature vectors correspond to an edge of the set of edges 'E' that can include features such as a start node (e.g., '$V_0$'), end node (e.g., '$V_1$'), edge category, etc. Furthermore, table program 200 utilizes identified lines of the table to determine whether edges of the 'DT' intersect to categorize an edge 'E'.

In another embodiment, table program 200 trains a machine learning algorithm to construct a tree structure corresponding to a generated graph of tabular data of a PDF document of database 144. For example, table program 200 trains a machine learning algorithm (e.g., an attention graph neural network, graph neural network, etc.) to create a tree presentation (e.g., tree structure) of a table (e.g., tabular data) utilizing node embeddings and adjacency relationships of the node embeddings. In this example, the machine learning algorithm can include two or more models (e.g., tree builder network, tree builder model, cell builder model, etc.) that table program 200 configures sequentially, which allows a first model (e.g., cell builder model) can utilize state information of a second model (e.g., tree builder model nodes) to predict content of cells (e.g., leaves) of the tree presentation (i.e., jointly training a tree builder model and a cell builder model to reconstruct a structured representation of tabular data of a PDF document).

Additionally, table program 200 can train the tree builder model with a sequence loss of actions, where an action includes tasks such as insert header, insert body, insert row, insert cell, go to parent, finish, etc., in constructing the tree presentation. Furthermore, table program 200 can train the cell builder model with a weighted sum of the sequence loss of actions, a sequence of loss of cell content, and column/row span regression loss to assign cell attributes, which can include a value corresponding to the amount of columns span, a value corresponding to the amount of rows span, and content of the cell. Also, the machine learning algorithm table 200 trains can include two or more attention mechanisms that are correlated with the two or more models, where an attention mechanism equips a neural network (e.g., machine learning algorithm) with the ability to focus on a subset of inputs (e.g., features) of the neural network.

In step 208, table program 200 reconstructs a tree structure of the table. In one embodiment, table program 200 generates a tree structure corresponding to a generated graph of tabular data of a PDF document of database 144. For example, table program 200 constructs a tree structured representation (e.g., tree representation) of tabular data (e.g., table) of a PDF document. In this example, table program 200 utilizes an output of a machine learning algorithm (e.g., tree builder model, neural network, AGNN, etc.) to determine an action (e.g., insert header, insert body, insert row, insert cell, etc.) to select in constructing the tree structure representation. Additionally, table program 200 determines branch assignments of the tree structure representation between parent nodes and child nodes utilizing the adjacency relationships (e.g., edges) of a generated graph (e.g., Graph [V, E]).

Figure 3C:
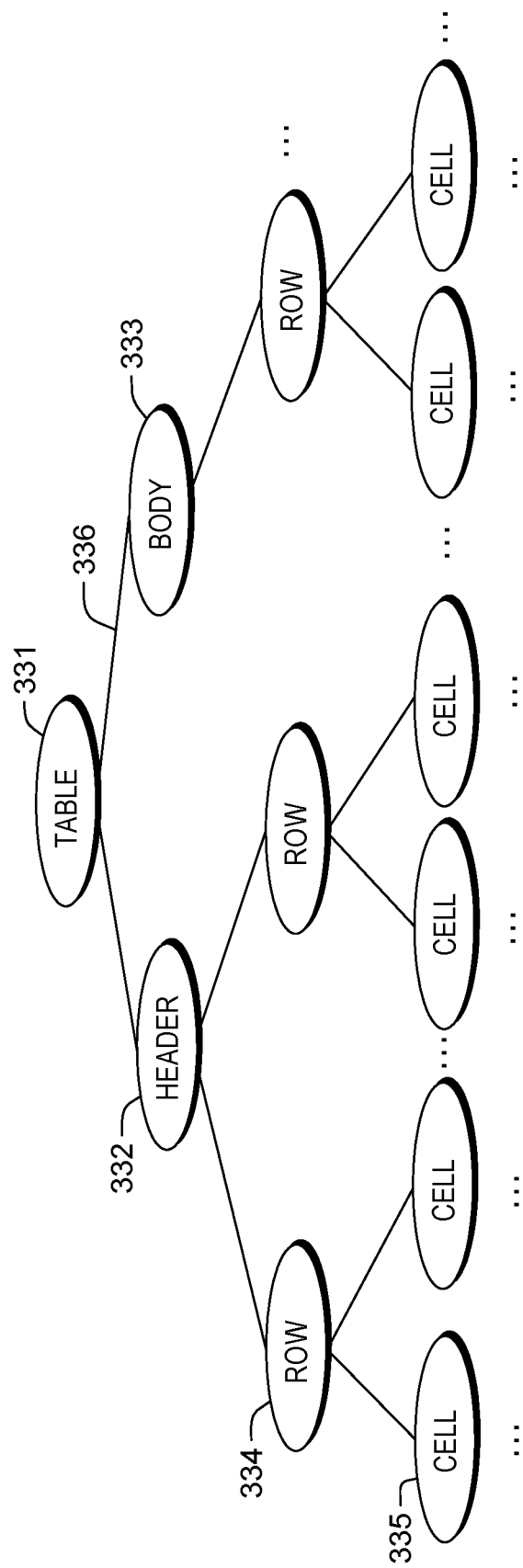
FIG. 3C is a diagram depicting an illustration of a tree structure corresponding to a table of a text-based PDF document, in accordance with embodiments of the present invention.

FIG. 3C depicts structure 330, which is an example illustration of an instance of a table of a text-based PDF document that table program 200 converts to a tree structure, in accordance with example embodiments of the present invention. Structure 330 includes table node 331, header node 332, body node 333, a plurality of instances of row node 334, a plurality of instances of cell node 335, and a plurality of instances of branch 336. Table node 331 is root node that corresponds to table 310 of FIG. 3A. Header node 332 is parent node that corresponds to header 313 of FIG. 3A. Row node 334 is child node that corresponds to tabular data (e.g., rows) of table 310, which may include one or more instances of leaves (e.g., cell node 335). Cell node 335 is a leaf node that may include content (e.g., characters, values, etc.) of table 310 of FIG. 3A. Branch 336 is an element of structure 330 that indicates adjacency relationships between nodes. Additionally, structure 330 includes a plurality of ellipses that indicate that one or more elements (e.g., nodes, rows, cells, etc.) of the tree structure are missing (i.e., not represented but included). In an example embodiment with respect to FIG. 3A, table program 200 utilizes a machine learning algorithm to select actions to reconstruct table 310 in the form of structure 330 (i.e., form a tree structure).

In step 210, table program 200 assigns attributes to the tree structure. In one embodiment, table program 200 assigns attributes to a generated tree structure corresponding to tabular data of a PDF document of database 144. For example, table program 200 determines cell attributes of one or more leaves (e.g., cells) of a tree structured representation (e.g., tree representation) of tabular data (e.g., table) of a PDF document. In this example, table program 200 utilizes an output of a machine learning algorithm (e.g., cell builder model, neural network, AGNN, etc.) to determine attributes (e.g., column span, row span, content, etc.) to assign when filling leaves of the tree structure representation.

Referring to FIG. 3C, in an example embodiment, table program 200 utilizes a machine learning algorithm to define attributes of cell node 335. In this example, table program 200 assigns characters and/or integer values that correspond to cell attributes (e.g., column span, row span, content, etc.) based on outputs of a machine learning algorithm. Additionally, column span is the number of columns of processed table 320 of FIG. 3B that content of a collection one or more nodes of FIG. 3B encompasses. Row span is the number of rows of processed table 320 of FIG. 3B that content of a collection one or more nodes of FIG. 3B encompasses. Content is a collection of characters/values (e.g., one or more nodes of processed table 320) of tabular data of a PDF document of database 144. In one scenario, if the content is the collection of nodes that include "Mean" of FIG. 3B, then table program 200 would assign cell attributes for cell node 335 as follows: Column span: (1); Row span: (1); and content: "Mean".

Figure 4:
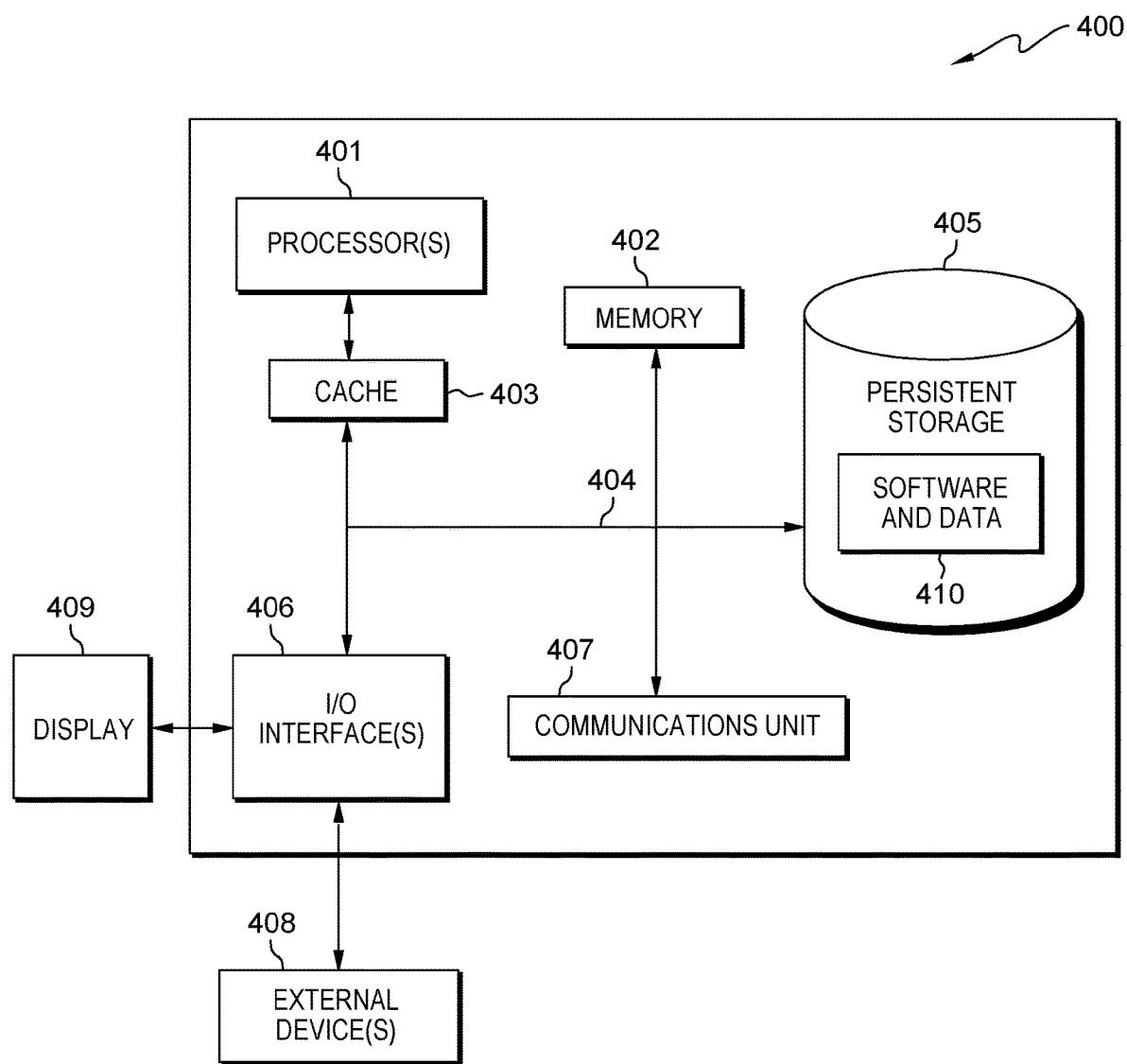
FIG. 4 is a block diagram of components of FIG. 1, in accordance with an embodiment of the present invention

FIG. 4 depicts a block diagram of components of client device 120 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to server 140, software and data 410 includes data of storage device 142 and table program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
training a machine learning algorithm utilizing one or more supervised training methods with one or more training sets and one or more testing sets, the machine learning algorithm including a tree builder model and a cell builder model;
extracting metadata corresponding to a set of tabular data in a table having border lines defining at least a body section of the table, the table being in a text-based portable document format (PDF), the metadata including relative positions of border lines making up the table and corresponding characters of the tabular data;
generating a first graph structure corresponding to the set of tabular data in the text-based PDF based at least in part on the metadata and the positions of characters and border lines in the table;
generating a vector representation comprising a set of feature vectors using the first graph structure; and
constructing, by the trained machine learning algorithm, a tree structure corresponding to the tabular data based at least in part on the vector representation, the tree structure including a body node identified by the tree builder model based on the metadata associated with the border lines defining the body section of the tabular data.

2. The method of claim 1, further comprising:
assigning, by one or more processors, attributes to one or more leaves of the tree structure based at least in part on the tabular data in the text-based PDF.

3. The method of claim 1, wherein generating the first graph structure corresponding to the tabular data in the text-based PDF, further comprises:
generating, by one or more processors, a node corresponding to each character of the tabular data in the text-based PDF based at least in part on character location information of the metadata;
identifying, by one or more processors, a plurality of vertices related to respective sets of nodes based at least in part on a triangulation technique, wherein each generated node of the set of nodes corresponds to a character of the tabular data; and
determining, by one or more processors, a plurality of edges related to the plurality of vertices, wherein the plurality of edges represents adjacency relationships between the respective sets of nodes.

4. The computer-implemented method of claim 1, wherein generating the vector representation of the first graph structure, further comprises:
   further generating, for the set of feature vectors, a first set of feature vectors that correspond to a node of a set of nodes of the first graph structure based at least in part on the metadata corresponding to the set of tabular data, wherein the node corresponds to a character of the set of tabular data;
   further generating, for the set of feature vectors, a second set of feature vectors that correspond to an edge of a set of edges of the first graph structure based at least in part on the metadata corresponding to the set of tabular data; and
   encoding the set of nodes and the set of edges of the first graph structure into a feature space utilizing the trained machine learning algorithm, the trained machine learning algorithm being an attention graph neural network.

5. The method of claim 1, wherein constructing the tree structure corresponding to the tabular data based at least in part on the vector representation, further comprises:
   selecting, by one or more processors, an action that configures parent and child nodes of the tree structure, wherein the action corresponds to elements of the tabular data; and
   determining, by one or more processors, branch assignments between the configured parent and child nodes of the tree structure.

6. The method of claim 1, further comprising:
   creating the one or more training sets for the machine learning algorithm based on a plurality of nodes and a plurality of vertices of a reference vector representation of a reference graph structure; and
   creating the one or more testing sets for the machine learning algorithm based on the plurality of nodes and the plurality of vertices of the reference vector representation.

7. A computer program product comprising:
   one or more computer readable storage media and program instructions stored on the one or more computer readable storage media, the program instructions comprising:
      program instructions to train a machine learning algorithm utilizing one or more supervised training methods with one or more training sets and one or more testing sets, the machine learning algorithm including a tree builder model and a cell builder model;
      program instructions to extract metadata corresponding to a set of tabular data in a table having border lines defining at least a body section of the table, the table being in a text-based portable document format (PDF), the metadata including relative positions of border lines making up the table and corresponding characters of the tabular data;
      program instructions to generate a first graph structure corresponding to the set of tabular data in the text-based PDF based at least in part on the metadata;
      program instructions to generate a first graph structure corresponding to the set of tabular data in the text-based PDF based at least in part on the metadata and the positions of characters and border lines in the table;
      program instructions to generate a vector representation comprising a set of feature vectors using the first graph structure; and
      program instructions to construct, by the trained machine learning algorithm, a tree structure corresponding to the tabular data based at least in part on the vector representation, the tree structure including a body node identified by the tree builder model based on the metadata associated with the border lines defining the body section of the tabular data.

8. The computer program product of claim 7, further comprising program instructions, stored on the one or more computer readable storage media, to:
   assign attributes to one or more leaves of the tree structure based at least in part on the tabular data in the text-based PDF.

9. The computer program product of claim 7, wherein program instructions to generate the first graph structure corresponding to the tabular data in the text-based PDF, further comprise program instructions to:
   generate a node corresponding to each character of the tabular data in the text-based PDF based at least in part on character location information of the metadata;
   identify a plurality of vertices related to respective sets of nodes based at least in part on a triangulation technique, wherein each generated node of the set of nodes corresponds to a character of the tabular data; and
   determine a plurality of edges related to the plurality of vertices, wherein the plurality of edges represents adjacency relationships between the respective sets of nodes.

10. The computer program product of claim 7, wherein program instructions to generate the vector representation of the first graph structure, further comprise program instructions to:
   further generate, for the set of feature vectors, a first set of feature vectors that correspond to a node of a set of nodes of the first graph structure based at least in part on the metadata corresponding to the set of tabular data, wherein the node corresponds to a character of the set of tabular data;
   further generate, for the set of feature vectors, a second set of feature vectors that correspond to an edge of a set of edges of the first graph structure based at least in part on the metadata corresponding to the set of tabular data; and
   encode the set of nodes and the set of edges of the first graph structure into a feature space utilizing the trained machine learning algorithm, the trained machine learning algorithm being an attention graph neural network.

11. The computer program product of claim 7, wherein program instructions to construct the tree structure corresponding to the tabular data based at least in part on the vector representation, further comprise program instructions to:
   select an action that configures parent and child nodes of the tree structure, wherein the action corresponds to elements of the tabular data; and
   determine branch assignments between the configured parent and child nodes of the tree structure.

12. A computer system comprising:
   one or more computer processors;
   one or more computer readable storage media; and
   program instructions stored on the computer readable storage media for execution by at least one of the one or more processors, the program instructions comprising:
      program instructions to train a machine learning algorithm utilizing one or more supervised training methods with one or more training sets and one or more testing sets, the machine learning algorithm including a tree builder model and a cell builder model;

program instructions to extract metadata corresponding to a set of tabular data in a table having border lines defining at least a body section of the table, the table being in a text-based portable document format (PDF), the metadata including relative positions of border lines making up the table and corresponding characters of the tabular data;

program instructions to generate a first graph structure corresponding to the set of tabular data in the text-based PDF based at least in part on the metadata;

program instructions to generate a first graph structure corresponding to the set of tabular data in the text-based PDF based at least in part on the metadata and the positions of characters and border lines in the table;

program instructions to generate a vector representation comprising a set of feature vectors using the first graph structure; and program instructions to construct, by the trained machine learning algorithm, a tree structure corresponding to the tabular data based at least in part on the vector representation, the tree structure including a body node identified by the tree builder model based on the metadata associated with the border lines defining the body section of the tabular data.

13. The computer system of claim 12, further comprising program instructions, stored on the one or more computer readable storage media for execution by at least one of the one or more processors, to:

assign attributes to one or more leaves of the tree structure based at least in part on the tabular data in the text-based PDF.

14. The computer system of claim 12, wherein program instructions to generate the first graph structure corresponding to the tabular data in the text-based PDF, further comprise program instructions to:

generate a node corresponding to each character of the tabular data in the text-based PDF based at least in part on character location information of the metadata;

identify a plurality of vertices related to respective sets of nodes based at least in part on a triangulation technique, wherein each generated node of the set of nodes corresponds to a character of the tabular data; and determine a plurality of edges related to the plurality of vertices, wherein the plurality of edges represents adjacency relationships between the respective sets of nodes.

15. The computer system of claim 12, wherein program instructions to generate the vector representation of the first graph structure, further comprise program instructions to:

further generate, for the set of feature vectors, a first set of feature vectors that correspond to a node of a set of nodes of the first graph structure based at least in part on the metadata corresponding to the set of tabular data, wherein the node corresponds to a character of the set of tabular data;

further generate, for the set of feature vectors, a second set of feature vectors that correspond to an edge of a set of edges of the first graph structure based at least in part on the metadata corresponding to the set of tabular data; and encode the set of nodes and the set of edges of the first graph structure into a feature space utilizing the trained machine learning algorithm, the trained machine learning algorithm being an attention graph neural network.

16. The computer system of claim 12, wherein program instructions to construct the tree structure corresponding to the tabular data based at least in part on the vector representation, further comprise program instructions to:

select an action that configures parent and child nodes of the tree structure, wherein the action corresponds to elements of the tabular data; and determine branch assignments between the configured parent and child nodes of the tree structure.

17. The computer system of claim 12, wherein the program instructions further comprise:

program instructions to create the one or more training sets for the machine learning algorithm based on a plurality of nodes and a plurality of vertices of a reference vector representation of a reference graph structure; and program instructions to create the one or more testing sets for the machine learning algorithm based on the plurality of nodes and the plurality of vertices of the reference vector representation.

* * * * *